United States Patent [19]
Roess

[11] 3,820,897
[45] June 28, 1974

[54] SYSTEM FOR THE OPTICAL MONITORING OF AIR POLLUTANTS IN A LARGE SPACE

[75] Inventor: Dieter Roess, Planegg, Germany

[73] Assignee: Siemens Aktiengesellschaft, Berlin and Munich, Germany

[22] Filed: June 19, 1972

[21] Appl. No.: 263,933

[30] Foreign Application Priority Data
July 2, 1971  Germany.............................. 2133080

[52] U.S. Cl. ................................. 356/75, 356/103
[51] Int. Cl. ............................................. G01j 3/44
[58] Field of Search ............... 356/75, 51, 103, 201; 250/218, 220 R

[56] References Cited
UNITED STATES PATENTS

| | | | |
|---|---|---|---|
| 3,047,723 | 7/1962 | Knapp | 350/220 R |
| 2,401,929 | 6/1946 | Hammond, Jr. | 250/218 |
| 3,500,063 | 3/1970 | Reno et al. | 250/220 R |
| 3,528,740 | 9/1970 | Gerry et al. | 356/75 |
| 3,606,564 | 9/1971 | Lisack | 250/218 |
| 3,625,613 | 12/1971 | Abell et al. | 356/75 |
| 3,640,626 | 2/1972 | Liskowitz | 250/218 |

*Primary Examiner*—Vincent P. McGraw
*Attorney, Agent, or Firm*—Hill, Gross, Simpson, Van Santen, Steadman, Chiara & Simpson

[57] ABSTRACT

A system for monitoring air pollutants in which laser radiation excites atoms and molecules contained in the atmosphere to specific Raman radiations, and the scattered radiations analyzed, utilizing a plurality of laser transmitting stations arranged in a line and a corresponding plurality of cooperable receiving stations, also arranged in a line, and operative to receive reflected transmissions from said transmitting stations.

The transmitting and receiving stations may be arranged along a common line with each transmitting station being disposed adjacent to a cooperable receiving station or on suitably spaced lines with all transmitting stations being arranged to transmit beams of rays extending in a common radiation plane, and each receiving station being disposed to receive return reflected radiation from the cooperable transmitting station, if desired with the use of suitable reflectors, at which receiving stations such radiation may be registered and analyzed.

Further, each transmitting station and the cooperable receiving station may be spaced a predetermined distance from each other, with each receiving station containing means for recording beams from several fixed directions, or the transmitting and receiving stations may be so disposed in conjunction with a plurality of beam dividers that the transmission beams and the received beams form a matrix-configurated network.

7 Claims, 4 Drawing Figures

SYSTEM FOR THE OPTICAL MONITORING OF AIR POLLUTANTS IN A LARGE SPACE

BACKGROUND OF THE INVENTION

The invention is directed to a system for the optical monotoring of air pollutants, utilizing a laser radiation which excites atoms and molecules contained in the atmosphere to specific Raman radiations, and which registers and analyzes such scattered radiations.

Air pollution resulting from modern industrial production processes, etc., is continually increasing and conceivably may have a serious detrimental effect upon the health of the living world. Consequently, a need as well as a desire to monitor and determine air pollution has existed over a relatively long period. Experiments directed to this problem have heretofore been made and in this country large surface, porous material test samples have been distributed in an area to be measured to enable the absorption of pollutants for subsequent qualitative and quantitative chemical examinations. However, in order to provide adequate pollutant concentrations in accordance with such method, the samples must be exposed to the air for long periods, even months. Furthermore, the data pertaining to the pollutants is derived only at the locations of the respective samples.

It is also known to employ a laser, in connection with the detection of pollutants in air, utilizing Raman-radar techniques, (spectroscopic detection of $SO_2$ and $CO_2$ molecules in the polluted atmosphere as disclosed in the article "Raman-Radar Technique" by Iakao Kobayasi and Humio Inaba, Applied Physics Letters, August 15, 1970). Such article describes the advantages of the Raman back scattering of laser beams by molecules, as compared with the back scattering of laser beams involving Mie scattering with respect to certain materials, and Rayleight scattering with respect to atmospheric molecules. However, it should be noted that in this case the frequency of the back scattered radiation is the same as that of the transmitted light, and as a result identification of pollutants is not derivable therefrom. However, by means of a laser Raman back scattering, a qualitative analysis of all chemicals in the polluted atmosphere may be readily achieved as the frequency of the scattered light is specifically shifted for each molecule relative to the initial frequency of the transmitted light. Likewise, it is thereby also possible to determine the distribution of molecular density of the polluted atmosphere. For example, if the concentration of $CO_2$ molecules is to be determined, the intensity ratio of the back scattered light with respect to $CO_2$ molecules and $O_2$ molecules will be required, as well as the Raman back scattering differential efficiency cross section of the $CO_2$ molecules, the spectrum indicating coefficient of the detector, and finally the Raman scattering coefficient of $O_2$. With the utilization of these factors the molecular density of $CO_2$ can be determined. In a similar manner, further air pollution components may be determined. In this article, however, only a laser transmitter and a receiver are referred to and consequently with such an arrangement air pollution can be thus monitored only in a small limited area.

The invention is directed to the problem of providing a system for monitoring air pollutants by means of which the measurement thereof may be effected at a number of places a large space or area.

BRIEF SUMMARY OF THE INVENTION

The problem is solved in accordance with the present invention, by the utilization of a plurality of laser transmitting stations, arranged along a line, and a plurality of cooperable receiving stations, likewise arranged along a line, and suitably oriented to receive back scattered transmission from such transmitting stations. The atoms and molecules contained in the atmosphere are thus excited by absorption with the production of specific Raman radiations, which are subsequently registered and analyzed at the respective receiving stations.

The transmitting and receiving stations may, for example, be disposed along a common line, in which a transmitting station is disposed adjacent an associated receiving station. All transmitting stations transmit beams in a common plane, with such beams preferably being parallel and the respective back scattered radiations being registered and analyzed in the associated receiving station. The radiation plane so formed may be horizontally disposed, with the air monitoring being carried out in such plane, and where a greater area is to be monitored, the number of laser transmitting and receiving stations may be increased.

It is of particular advantage if the arrangement is such orientation that the radiation plane is variable and may be adjusted to assume an angle relative to the horizontal, and in this case, if desired, a plurality of measurements at different angles may be effected whereby a spacial monitoring of an area is achieved.

Such arrangements as described will also enable the determination of the locations of the scattered particles by analysis of the transit time of the radiation. Consequently, as a pair of cooperable transmitting and receiving stations may be arranged relatively closely adjacent, the receiving station can register scattered radiations from particles located at different distances irrespective of the directional characteristics of the arrangement.

However, the locations of the scattering points can be derived, in a further advantageous arrangement, wherein each transmitting station and each cooperable receiving station are spaced a different distance from one another, with each receiving station being arranged to receive radiation from several fixed directions. In this arrangement the transmitted and the back scattered beams include known angles from which the location of the scattering points can be determined.

In a further arrangement, reflectors may be disposed on the beam paths, at given distances from the associated transmitting station, which are operable to reflect the beams toward the respective receivers. Consequently, it is possible in addition to the measurement of the scattered radiation, to also effect transmission measurements, which, as narrow-banned absorption measurements are involved, result in a higher degree of efficiency due to narrow-banned absorption.

In a further embodiment of the invention the arrangement may be such that the transmitted and received rays form a matrix-configurated network, wherein all transmitting stations are, for example, arranged in a line forming a column and all receiving stations are arranged in a line forming a row extending transverse to such column, where, by the use of beam dividers, for example symmetrically disposed on the beam paths, a portion of each transmitted beam will be allowed to pass towards the next beam divider on the same beam path and at the same time a portion of such transmitted beam is deflected toward a cooperable receiving station. Thus, the control area can be even further enlarged. Since all receiving stations derive radiation from all of the transmitting stations, pollutants disposed in many sub-areas of the entire space may be obtained. It is particularly advantageous in this arrangement if all received data is recorded in central recording means and the data ultimately processed at a central location.

In some cases it may be advantageous to take into account specific problems, for example in cities, to employ a network with respect to the transmission and received radiation which is asymmetrical.

In any event, it may be particularly desirable in any of the examples to provide central recording means for all received data whereby the latter may be centrally processed, and if desired, displayed.

BRIEF DESCRIPTION OF THE DRAWINGS

In the drawings wherein like reference characters indicate like or corresponding parts.

DETAILED DESCRIPTION OF THE PREFERRED EMBODIMENTS OF THE INVENTION

Figure 1:
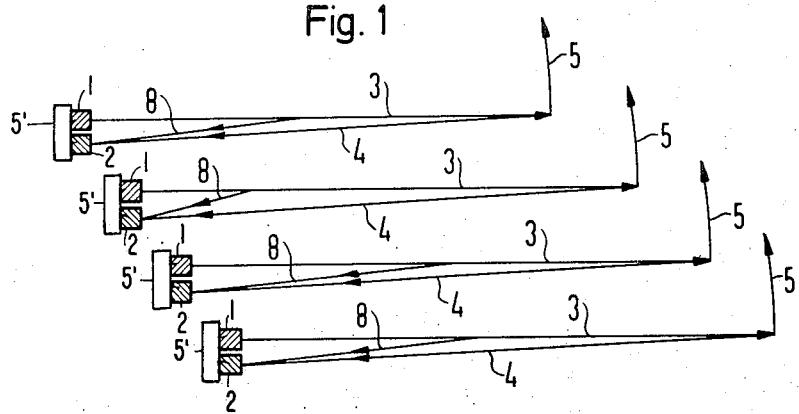
FIG. 1 illustrates a series of pairs of cooperable transmitting and receiving stations with the transmitting paths being suitably oriented in a common plane which may be rotated.

Each of the Figures of the drawing illustrate an example of a system for monitoring air pollutants, embodying the concepts of the present invention, and all utilize a plurality of laser transmitting stations arranged in a line and a corresponding plurality of cooperable receiving stations also arranged in a line and oriented to receive back scattered impulses transmitted from the transmitting stations.

First Embodiment

Referring to FIG. 1, there are illustrated a plurality of laser impulse transmitting stations 1, disposed in spaced relation along a line, and in like manner a plurality of receiving stations 2 are arranged along an adjacent line extending relatively closely adjacent to the line of the transmitting stations, with each transmitting station having closely positioned adjacent thereto a corresponding receiving station. The laser light from the respective transmitting stations is transmitted in parallel beams and back scattered toward the adjacent receiving station, for example, in the directions 4 and/or 8. Each of the stations 3 includes an evaluation device, each station receiving only the light which is back scattered by the particles within the path of the light beam transmitted by the adjacent transmitting station.

The transmitted laser impulses must be shorter, with respect to time, than the transit times of the radiation from the transmitting station over the scattering point towards the receiver, to enable the determination of the scattering point, with the qualitative determination of the scattering particles being determined from the resulting frequency shift appearing in the received pulses. In this embodiment the respective laser beams are disposed in a common horizontal plane, and it may be advantageous in this arrangement to suitably effect a stage-wise change in the beam directions by suitable means indicated generally by the reference numeral 5', as indicated by the arrows 5, the receiving stations likewise being rotated into the respective directions. By this means, several planes may be traversed by the beams in a stage-wise succession, and respective measurements carried out. After a complete cycle in such different planes has been effected, a spacial distribution of the air pollutants may be derived.

In this arrangement it is not necessarily required that the laser beams be transmitted in parallel direction, as they may also extend in different directions in the common plane, in which the desired relationship between cooperable transmitting and receiving stations must be maintained. In the operation of this modification, the plane likewise may be inclined with respect to the horizontal, as previously described.

Second Embodiment

Figure 2:
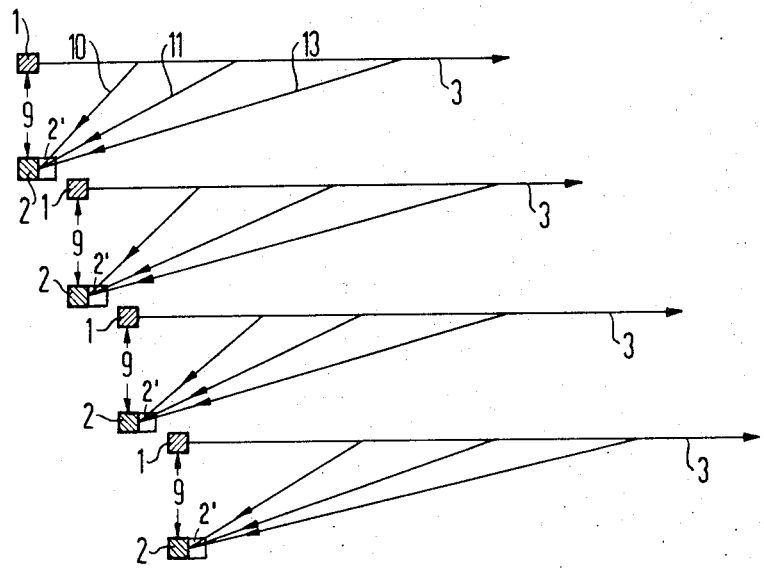
FIG. 2 illustrates an arrangement similar to FIG. 1 but involving a different beam geometry.

FIG. 2 illustrates an embodiment of the invention in which the distance of the scattering particles does not have to be resolved by the receiving station, as the distance may be determined by the beam geometry. In this embodiment each transmitting station 1 and the cooperable receiving station 2 are disposed at a predetermined spacing 9. The receiving stations are constructed with several evaluation devices indicated collectively by the reference numeral 2', for receiving the scattered radiation from the fixed directions 10, 11, and 13, and as the transmission direction is fixed, the scattering points can be readily calculated. In this case the known transit time can be utilized in order to limit the noise portion of the measuring duration, by utilization of a circuit having a suitably short time response.

Third Embodiment

Figure 3:
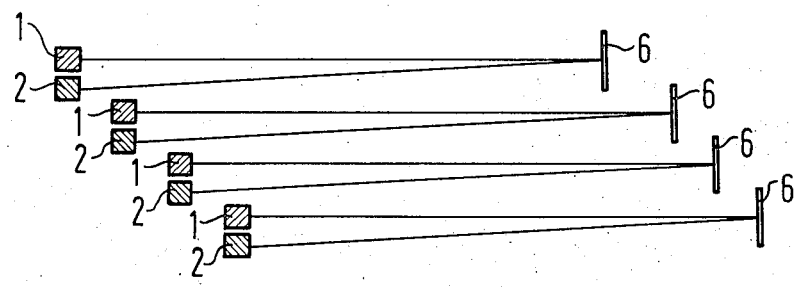
FIG. 3 illustrates an arrangement similar to FIG. 1 but employing radiation reflectors.

The arrangement of FIG. 3 is generally similar to that illustrated in FIG. 1, utilizing a line of receiving stations disposed adjacent to a line of transmitting stations, with reflectors 6 being disposed at a predetermined distance from the transmitting and receiving stations. The reflectors 6 are suitably oriented to reflect the laser light back to the respective receiving stations with the scattered radiation produced on the path of the laser radiation likewise being simultaneously received by the receiving stations. Likewise, transmission measurements can also be effected with the aid of the reflectors 6 whereby they also contribute to a quantitative and qualitative analysis of the atoms and molecules present on the radiation path. As the radiation appearing at the receiving stations is of greater strength as a result of the use of the reflector, the distance between the reflectors and the cooperable transmitting and receiving stations can be increased. However, since the illustrated reflectors 6 are disposed in fixed positions, the measurements can be carried out only in the single radiation plane.

Fourth Embodiment

Figure 4:
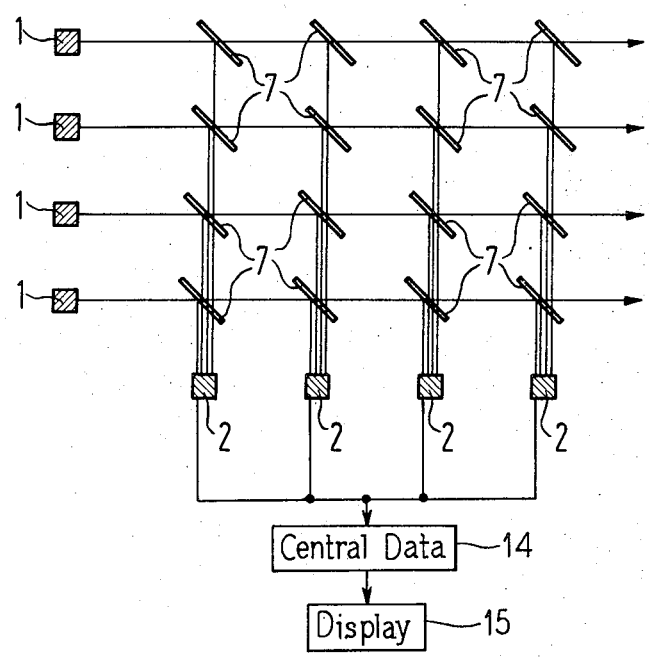
FIG. 4 illustrates an arrangement in which the transmitted and received beam paths are coordinately arranged, employing a plurality of beam dividers.

In the embodiment of FIG. 4 the line of transmitting station 1 is disposed at right angles to the line of receiving stations 2, and interposed in each beam path of a respective transmitting station are a plurality of beam dividers 7, each of which is oriented to permit a portion of the laser light to pass on to the next beam divider and to deflect the remaining portion of the laser light towards the cooperable receiving station 2, whereby the resulting arrangement presents a matrix-configurated network, with each of the receiving stations 2 receiving radiation originating with each of the laser beams transmitted by the respective transmitting stations 1. With this arrangement, both scattering measurements and absorption measurements can be effected. Likewise, if a predetermined time succession of the respective laser beam impulses transmitted by the respective transmitting stations 1 is utilized, the impurities can be detected in the respective individual paths. As indicated in FIG. 4, in block form, the data obtained at the individual receiving stations 2 can be suitably conducted to a central station or location 14, for recording and for illustration, for example on suitable indicating means indicated generally by the numeral 15.

It will be appreciated that it is not necessary that the transmitting stations 1 and receiving stations 2 be disposed on straight lines nor that the beam dividers be symmetrically arranged, and if deemed desirable the respective stations may be located as desired and the beam dividers positioned in an asymmetrical relation.

It will be appreciated from the above description that the presence of air pollutants can be readily ascertained at any time by means of such a system and peak values and average values readily calculated from the operational results obtained.

While I have described my invention by reference to certain illustrative embodiments thereof, many changes and modifications may be made in the invention by one skilled in the art without departing from the spirit and scope thereof, and it is to be understood that I intend to include within the patent warranted hereon all such changes and modifications as may reasonably and properly be included within the scope of my contribution to the art.

I claim:

1. In a system for monitoring air pollution over inaccessible areas, in which laser radiation excites atoms and molecules contained in the atmosphere to specific Raman radiations and the scattered radiations analyzed, the combination of a plurality of laser transmitting stations arranged in a line at relatively fixed locations, each of which stations is operative to transmit laser radiation along a predetermined line of direction, and a corresponding plurality of cooperable receiving stations, also arranged in a line at locations relatively fixed with respect to the transmitting stations cooperable therewith, and oriented to receive back scattered impulses originating along the respective transmission lines from said transmitting stations, each of said receiving stations being arranged to receive scatter radiation from a plurality of different directions which are fixed with respect to the transmission direction line of the transmitting station from which such radiation is derived, with the radiation received at a receiving station including that from two different directions derived from the transmission from a cooperable transmitting station, whereby each receiving station is adapted to simultaneously analyze scattered radiation from a plurality of locations.

2. A system according to claim 1, wherein the transmitting stations and the receiving stations are arranged along a common line with each transmitting station being disposed adjacent to a cooperable receiving station, all transmitting stations being arranged to transmit beams of rays extending in a common radiation plane, and each receiving station being disposed to receive return reflected radiation from the cooperable transmitting station, at which receiving station such radiation may be registered and analyzed.

3. A system according to claim 2, comprising central recording means arranged to receive data from all receiving stations, operable to process and coordinate the same for recordation and display thereof.

4. A system according to claim 2, wherein said radiation plane is horizontally disposed.

5. A system according to claim 4, wherein said systems are so arranged that the radiation plane may be selectively adjusted in angular relation with respect to the horizontal.

6. A system according to claim 1, wherein each transmitting station and the cooperable receiving station are spaced a predetermined distance from each other, and each receiving station contains means for recording beams from several fixed directions.

7. A system according to claim 6, comprising central recording means arranged to receive data from all receiving stations, operable to process and coordinate the same for recordation and display thereof.

* * * * *